United States Patent
Li

(10) Patent No.: US 11,271,748 B2
(45) Date of Patent: Mar. 8, 2022

(54) CONSENSUS METHODS AND SYSTEMS IN CONSORTIUM BLOCKCHAIN

(71) Applicant: ALIPAY (HANGZHOU) INFORMATION TECHNOLOGY CO., LTD., Zhejiang (CN)

(72) Inventor: Shuai Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/353,508

(22) Filed: Jun. 21, 2021

(65) Prior Publication Data
US 2021/0314162 A1    Oct. 7, 2021

(30) Foreign Application Priority Data
Jul. 3, 2020   (CN) .......................... 202010630186.4

(51) Int. Cl.
H04L 9/32         (2006.01)
H04L 29/06        (2006.01)

(52) U.S. Cl.
CPC .......... *H04L 9/3236* (2013.01); *H04L 63/123* (2013.01); *H04L 2209/38* (2013.01)

(58) Field of Classification Search
CPC . H04L 9/3236; H04L 63/123; H04L 2209/38; H04L 67/1097; H04L 1/004; H04L 1/0061
See application file for complete search history.

(56) References Cited

U.S. PATENT DOCUMENTS

| | | | |
|---|---|---|---|
| 2016/0085955 A1* | 3/2016 | Lerner | G06F 21/725 726/20 |
| 2018/0109516 A1* | 4/2018 | Song | H04L 9/3268 |

(Continued)

FOREIGN PATENT DOCUMENTS

| | | |
|---|---|---|
| CN | 106529951 | 3/2017 |
| CN | 109345386 | 2/2019 |

(Continued)

OTHER PUBLICATIONS

Castro et al, "Practical Byzantine Fault Tolerance," Proceedings of the 3rd Symposium on Operating Systems Design and Implementation, Feb. 1999, 14 pages.

(Continued)

*Primary Examiner* — Taghi T Arani
*Assistant Examiner* — Blake I Narramore
(74) *Attorney, Agent, or Firm* — Fish & Richardson P.C.

(57) ABSTRACT

Disclosed herein are consensus methods, systems, and media. One of the methods includes: splitting, by a primary node in a consensus network, transactions into data fragments, wherein a number of data fragments equals that of the nodes; constructing a Merkle tree based on the data fragments; constructing first messages, wherein each first message comprises a data fragment, a Merkle tree path, and a root hash of the Merkle tree, and wherein each first message corresponds to a respective data fragment and a respective node; sending each first message to the respective node; saving one first message to the primary node; constructing, a second message based on the first message corresponding to the primary node; and broadcasting the second message to the consensus network; receiving other second messages broadcasted by other nodes; and determining, whether a consensus on the transactions is reached based on the other second messages.

20 Claims, 2 Drawing Sheets

(56) References Cited

U.S. PATENT DOCUMENTS

| | | | |
|---|---|---|---|
| 2018/0189877 A1* | 7/2018 | Uhr | G06Q 20/387 |
| 2018/0307573 A1 | 10/2018 | Abraham et al. | |
| 2018/0308091 A1 | 10/2018 | Malkhi et al. | |
| 2019/0286531 A1 | 9/2019 | Lin | |
| 2020/0050780 A1* | 2/2020 | Uhr | G06F 21/6209 |
| 2020/0142765 A1 | 5/2020 | Yang | |
| 2020/0220732 A1* | 7/2020 | Shasha | H04L 9/3239 |
| 2021/0034455 A1* | 2/2021 | Deng | H04L 9/3239 |
| 2021/0109825 A1* | 4/2021 | Liao | H04L 9/14 |
| 2021/0256145 A1* | 8/2021 | Shrinivasan | H04L 9/14 |

FOREIGN PATENT DOCUMENTS

| | | |
|---|---|---|
| CN | 109359223 | 2/2019 |
| CN | 109379397 | 2/2019 |
| CN | 109491968 | 3/2019 |
| CN | 110688377 | 1/2020 |
| CN | 111526219 | 8/2020 |
| WO | WO 2020042805 | 5/2020 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Bracha et al, "Asynchronous Byzantine agreement protocols", Information and Computation, Academic Press, Nov. 1, 1987, 14 pages.

Cachin et al, "Asynchronous Verifiable Information Dispersal", IEEE Explore, Nov. 15, 2004, 20 pages.

EP Extended Search Report and Written Opinion in European Application No. 21182221.8, dated Nov. 24, 2021, 3 pages.

Miller et al, "The Honey Badger of BFT Protocols", ACM Press, Oct. 24, 2016, 12 pages.

* cited by examiner

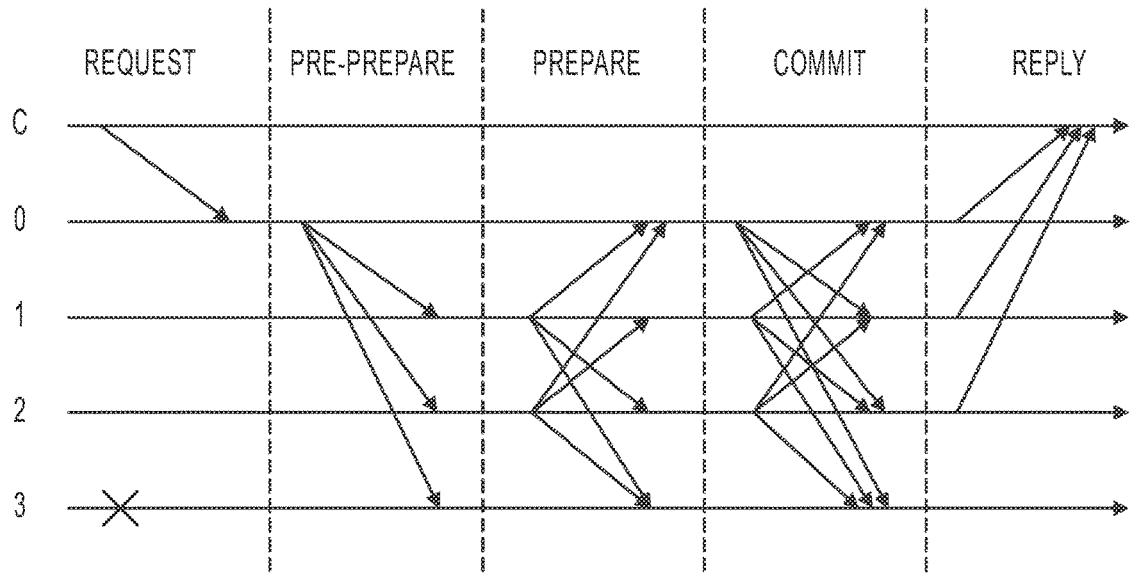

FIG. 1

A consensus primary node in a consensus network of a consortium blockchain splits, based on a specified erasure coding algorithm, transactions in a transaction list on which a consensus is to be reached into a plurality of orderly arranged data fragments that have a same quantity as consensus nodes in the consensus network, and constructs a Merkle tree based on the plurality of orderly arranged data fragments ⎬—210

The consensus primary node constructs a VAL message corresponding to each data fragment based on the plurality of orderly arranged data fragments and the Merkle tree, sends each VAL message to a consensus node corresponding to a sequence of the data fragment in each VAL message, and locally saves a VAL message corresponding to the consensus primary node ⎬—220

Each consensus node in the consensus network constructs an ECHO message for a received VAL message, and broadcasts the constructed ECHO message to the consensus network ⎬—230

If a target consensus node in the consensus network does not receive a VAL message corresponding to the target consensus node within a predetermined time period but receives ECHO messages of N−2f consensus nodes, the target consensus node constructs an ECHO message corresponding to the target consensus node based on the ECHO messages of the N−2f consensus nodes ⎬—240

FIG. 2

CONSENSUS METHODS AND SYSTEMS IN CONSORTIUM BLOCKCHAIN

CROSS-REFERENCE TO RELATED APPLICATIONS

This application claims priority to Chinese Patent Application No. 202010630186.4, filed on Jul. 3, 2020, which is hereby incorporated by reference in its entirety.

TECHNICAL FIELD

The present specification relates to the field of computer technologies, and in particular, to consensus methods and systems in a consortium blockchain.

BACKGROUND

At present, the practical Byzantine fault tolerance (PBFT) mainly includes two parts: a normal case phase and a view change phase. The normal case phase includes PRE-PREPARE, PREPARE, and COMMIT stages to complete a consensus.

In the PRE-PREPARE stage, a consensus primary node initiates a proposal, and sends a PRE-PREPARE message for the proposal to each consensus backup node. In the PREPARE stage, each consensus backup node verifies a received PRE-PREPARE message, and after the verification succeeds, sends a PREPARE message to other consensus backup nodes and the consensus primary node. In the COMMIT stage, the consensus backup node or the consensus primary node receives one PRE-PREPARE message and PREPARE messages of not less than 2f consensus nodes, and sends a COMMIT message to other consensus nodes in the consortium blockchain if the verification succeeds. However, if some consensus nodes do not receive the PRE-PREPARE message within a predetermined time period in the process, a consensus operation on the proposal cannot be continued.

SUMMARY

Embodiments of the present specification provide consensus methods and systems in a consortium blockchain to solve a problem that a consensus cannot be reached because some consensus nodes may not receive a PRE-PREPARE message timely in a round of consensus operation in an existing consortium blockchain.

To solve the previous technical problem, the embodiments of the present specification are implemented as described below:

According to a first aspect, a consensus method in a consortium blockchain is provided, including: A consensus primary node in a consensus network of the consortium blockchain splits, based on a specified erasure coding algorithm, transactions in a transaction list on which a consensus is to be reached into a plurality of orderly arranged data fragments that have a same quantity as consensus nodes in the consensus network, and constructs a Merkle tree based on the plurality of orderly arranged data fragments. The consensus primary node constructs a VAL message corresponding to each data fragment based on the plurality of orderly arranged data fragments and the Merkle tree, sends each VAL message to a consensus node corresponding to a sequence of the data fragment in each VAL message, and locally saves a VAL message corresponding to the consensus primary node, where each VAL message includes one data fragment, a corresponding Merkle tree path, and a root hash of the Merkle tree. Each consensus node in the consensus network constructs an ECHO message for a received VAL message, and broadcasts the constructed ECHO message to the consensus network, where the constructed ECHO message includes a data fragment, a corresponding Merkle tree path, and the root hash of the Merkle tree in the received VAL message. If a target consensus node in the consensus network does not receive a VAL message corresponding to the target consensus node within a predetermined time period but receives ECHO messages of N−2f consensus nodes, the target consensus node constructs an ECHO message corresponding to the target consensus node based on the ECHO messages of the N−2f consensus nodes, where f is a maximum quantity of abnormal consensus nodes allowed in the consensus network, N is a quantity of consensus nodes in the consensus network, and N≥3f+1.

According to a second aspect, a system in a consortium blockchain is provided, including: a consensus primary node in a consensus network of the consortium blockchain, configured to split, based on a specified erasure coding algorithm, transactions in a transaction list on which a consensus is to be reached into a plurality of orderly arranged data fragments that have a same quantity as consensus nodes in the consensus network, and construct a Merkle tree based on the plurality of orderly arranged data fragments; and construct a VAL message corresponding to each data fragment based on the plurality of orderly arranged data fragments and the Merkle tree, send each VAL message to a consensus node corresponding to a sequence of the data fragment in each VAL message, and locally save a VAL message corresponding to the consensus primary node, where each VAL message includes one data fragment, a corresponding Merkle tree path, and a root hash of the Merkle tree; each consensus node in the consensus network, configured to construct an ECHO message for a received VAL message, and broadcast the constructed ECHO message to the consensus network, where the constructed ECHO message includes a data fragment, a corresponding Merkle tree path, and the root hash of the Merkle tree in the received VAL message; and a target consensus node in the consensus network, configured to: if the target consensus node does not receive a VAL message corresponding to the target consensus node within a predetermined time period but receives ECHO messages of N−2f consensus nodes, construct an ECHO message corresponding to the target consensus node based on the ECHO messages of the N−2f consensus nodes, where f is a maximum quantity of abnormal consensus nodes allowed in the consensus network, N is a quantity of consensus nodes in the consensus network, and N≥3f+1.

The embodiments of the present specification can achieve at least the following technical effects by using the previous technical solutions:

In the consensus method provided in some embodiments of the present specification, the consensus primary node in the consensus network of the consortium blockchain splits, based on the specified erasure coding algorithm, the transactions in the transaction list on which a consensus is to be reached into the plurality of orderly arranged data fragments that have the same quantity as the consensus nodes in the consensus network, and constructs the Merkle tree based on the plurality of orderly arranged data fragments. The consensus primary node constructs the VAL message corresponding to each data fragment based on the plurality of orderly arranged data fragments and the Merkle tree, sends each VAL message to the consensus node corresponding to the sequence of the data fragment in each VAL message, and locally saves the VAL message corresponding to the consensus primary node, where each VAL message includes one data fragment, a corresponding Merkle tree path, and the root hash of the Merkle tree. Each consensus node in the consensus network constructs the ECHO message for the received VAL message, and broadcasts the constructed ECHO message to the consensus network, where the constructed ECHO message includes the data fragment, the corresponding Merkle tree path, and the root hash of the Merkle tree in the received VAL message. If the target consensus node in the consensus network does not receive the VAL message corresponding to the target consensus node within the predetermined time period but receives the ECHO messages of the N−2f consensus nodes, the target consensus node constructs the ECHO message corresponding to the target consensus node base on the ECHO messages of the N−2f consensus nodes.

In other words, in each round of consensus operation, even if some consensus nodes do not receive the VAL message, it can be ensured that the complete transaction list on which a consensus is to be reached is obtained through parsing when 2f+1 ECHO messages are received, that is, it can be ensured that when some consensus nodes do not receive the VAL message, the system can continue to perform the consensus operation on the transaction list on which a consensus is to be reached.

BRIEF DESCRIPTION OF DRAWINGS

The accompanying drawings described here are used to provide a further understanding of the present specification, and constitute a part of the present specification. The example embodiments of the present specification and descriptions thereof are used to explain the present specification, and are not intended to constitute an undue limitation on the present specification. In the accompanying drawings:

FIG. 1 is a schematic flowchart illustrating a normal case phase after an erasure coding algorithm is combined with a PBFT consensus algorithm;

FIG. 2 is a schematic flowchart illustrating implementation of a consensus method in a consortium blockchain, according to some embodiments of the present specification;

DESCRIPTION OF EMBODIMENTS

Figure 3:
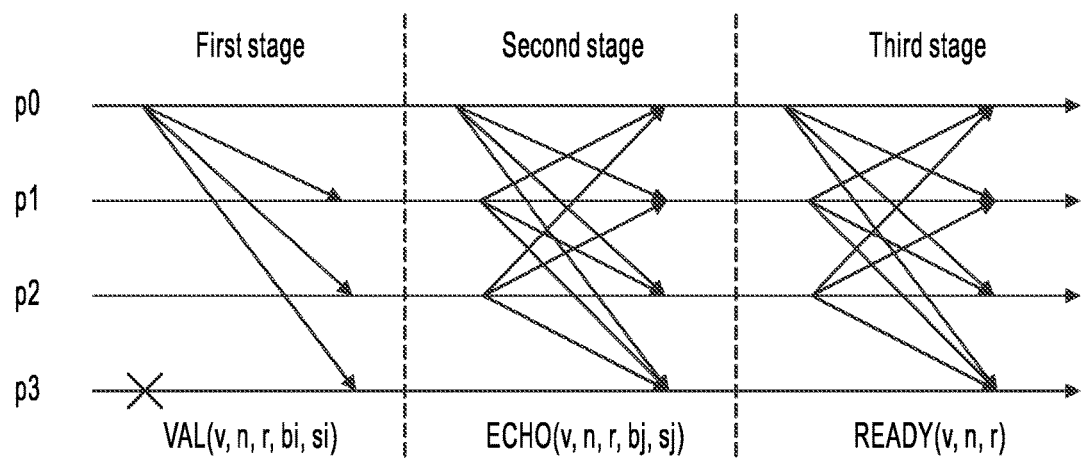
FIG. 3 is a schematic diagram illustrating an actual scenario to which a consensus method in a consortium blockchain is applied, according to some embodiments of the present specification.

To make the objectives, technical solutions, and advantages of the present specification clearer, the following clearly and comprehensively describes the technical solutions of the present specification with reference to the embodiments and corresponding accompanying drawings of the present specification. Clearly, the described embodiments are merely some rather than all of the embodiments of the present specification. All other embodiments obtained by a person of ordinary skill in the art on the basis of the embodiments of the present specification without creative efforts shall fall within the protection scope of the present specification.

The technical solutions provided in some embodiments of the present specification are described in detail below with reference to the accompanying drawings.

As described in the background, when a consensus operation is performed on a target proposal by using a conventional PBFT algorithm, in a PRE-PREPARE stage in a normal case phase, a consensus primary node sends N−1 identical PRE-PREPARE messages for the target proposal to N−1 consensus backup nodes. Because the PRE-PREPARE messages include transactions on which a consensus is to be reached and that are packaged by the consensus primary node, network bandwidth occupied by the consensus primary node is relatively large. However, messages broadcast by the consensus backup node in a PREPARE stage and a COMMIT stage do not include the original text of the transaction on which a consensus is to be reached, but only include a digest value of the transaction on which a consensus is to be reached. Consequently, overall network traffic consumption of the consensus backup node is obviously less than network traffic consumption of the consensus primary node, causing an imbalance between the consensus primary node and the consensus backup node in bandwidth consumption.

To increase a system throughput, the consensus primary node can package more transactions on which a consensus is to be reached into one PRE-PREPARE message. If the consensus primary node packages more transactions in the PRE-PREPARE message, the PRE-PREPARE message is larger, and the consensus primary node consumes larger network bandwidth. Furthermore, packaging an excessively large quantity of transactions in the PRE-PREPARE message in the PRE-PREPARE stage by the consensus primary node consumes more time. In the PRE-PREPARE stage, the network bandwidth and computation of the consensus backup node are in an idle state.

To solve the previously-mentioned problems, an erasure coding algorithm can be combined with the PBFT consensus algorithm to reduce a quantity of transactions on which a consensus is to be reached and that are packaged in the PRE-PREPARE message by the consensus primary node in the PRE-PREPARE stage, so that network bandwidth consumption of the consensus primary node in the normal case phase is reduced. Erasure coding (EC) is a fault-tolerance coding technology, is first used for data recovery in data transmission in the communication industry. Verification data is added to original data, so that data after split can be correlated. If a certain range of data errors are allowed, data before split can be recovered by using the erasure coding technology. For example, N blocks are generated through EC by using data m, and are sent to corresponding N nodes, and a consensus node that receives a data fragment after split needs to receive at least N−2f blocks to recover original data m.

Specifically, As shown in FIG. 1, FIG. 1 is a schematic flowchart illustrating the normal case phase in which the consensus operation is performed on the target proposal by using the PBFT after the erasure coding algorithm is applied to the PBFT consensus algorithm. In FIG. 1, a quantity N of consensus nodes in the consensus network is equal to 4, the consensus primary node is consensus node 0, the consensus backup nodes are consensus node 1 to consensus node 3, and consensus node 3 is an abnormal consensus node in the consensus network. In this consensus network, a process of the normal case phase in which the consensus operation is performed on the target proposal includes:

S1. In response to a request (REQUEST) of a client device, the consensus primary node in the consensus network, namely, consensus node 0, fetches a certain quantity of transactions from a local transaction pool, packages the transactions as message m0 as a target proposal, splits message 0 into four data fragments (block00 to block03) through processing by using the specified erasure coding algorithm, and constructs a Merkle tree based on hash values of the four data fragments (block00 to block03) after split. The hash value of block00 is hash000, the hash value of block01 is hash001, the hash value of block02 is hash002, the hash value of block03 is hash003, hash (hash00, hash01) =hash00, hash (hash002, hash003)=hash01, and hash (hash01, hash02)=hash0, namely, a root hash of the Merkle tree.

S2. The consensus primary node locally saves block00 and the hash value (hash001, hash01) of block00 on a hash path on the Merkle tree, and root hash hash0 of the Merkle tree, and constructs PRE-PREPARE messages based on other data fragments, corresponding Merkle tree paths, and the root hash of the Merkle tree, and sends the PRE-PREPARE messages to consensus nodes corresponding to data fragments in the PRE-PREPARE messages. Specifically, a PRE-PREPARE message including (block01 and hash000, hash01, and hash0) can be sent to node 1, a PRE-PREPARE message including (block02 and hash030, hash00, and hash0) can be sent to node 2, and a PRE-PREPARE message including (block03 and hash020, hash00, and hash0) can be sent to node 3.

S3. After verifying the received PRE-PREPARE message, a consensus backup node that receives the PRE-PREPARE message can construct, based on the received PRE-PREPARE message, a PREPARE message including the received data fragment, corresponding Merkle tree path, and root hash of the Merkle tree, and broadcast the constructed PREPARE message to other nodes in the consensus network.

S4. If the consensus primary node and other consensus backup nodes in the consensus network receive PREPARE messages of not less than 2f+1 nodes and the verification succeeds, send a COMMIT message and a message signature to the other consensus nodes in the consortium blockchain.

S5. After receiving the COMMIT message, the consensus primary node and the consensus backup node verify the received COMMIT message, if the consensus primary node or the consensus backup node receives 2f+1 verified COMMIT messages, it means that most consensus nodes in the current consensus network have reached a consensus on the target proposal, and a REPLY message is returned to the client device, to indicate that a network-wide consensus has been reached on the request initiated by the client device.

However, in the PREPARE stage in the previous normal case phase for performing the consensus operation on the target proposal, the consensus primary node does not construct a PREPARE message for locally saved block00, the hash value (hash001, hash01) of block00 on the hash path on the Merkle tree, and root hash hash0 of the Merkle tree, and does not broadcast the PREPARE message to other consensus nodes. Consequently, if some consensus nodes do not receive the PRE-PREPARE message within a predetermined time period, the consensus node cannot recover and obtain message m0 before split, construction of a PREPARE message of the present consensus node is affected, and the consensus operation on the target proposal of the entire consensus network is affected.

To solve the problem, the consensus method in a consortium blockchain is provided in some embodiments of the present specification. In the consensus method provided in some embodiments of the present specification, the consensus primary node in the consensus network of the consortium blockchain splits, based on the specified erasure coding algorithm, the transactions in the transaction list on which a consensus is to be reached into the plurality of orderly arranged data fragments that have the same quantity as the consensus nodes in the consensus network, and constructs the Merkle tree based on the plurality of orderly arranged data fragments. The consensus primary node constructs the VAL message corresponding to each data fragment based on the plurality of orderly arranged data fragments, sends each VAL message to the consensus node corresponding to the sequence of the data fragment in each VAL message, and locally saves the VAL message corresponding to the consensus primary node, where each VAL message includes one data fragment, a corresponding Merkle tree path, and the root hash of the Merkle tree. Each consensus node in the consensus network constructs the ECHO message for the received VAL message, and broadcasts the constructed ECHO message to the consensus network, where the constructed ECHO message includes the data fragment, the corresponding Merkle tree path, and the root hash of the Merkle tree in the received VAL message. If the target consensus node in the consensus network does not receive the VAL message corresponding to the target consensus node within the predetermined time period but receives the ECHO messages of the N−2f consensus nodes, the target consensus node constructs the ECHO message corresponding to the target consensus node base on the ECHO messages of the N−2f consensus nodes.

As such, in each round of consensus operation, even if some consensus nodes do not receive the VAL message, it can be ensured that the complete transaction list on which a consensus is to be reached is obtained through parsing when 2f+1 ECHO messages are received, that is, it can be ensured that when some consensus nodes do not receive the VAL message, the system can continue to perform the consensus operation on the transaction list on which a consensus is to be reached.

Specifically, FIG. 2 is a schematic flowchart illustrating implementation of a consensus method in a consortium blockchain, according to one or more embodiments of the present specification. The method includes the following:

Step 210. A consensus primary node in a consensus network of the consortium blockchain splits, based on a specified erasure coding algorithm, transactions in a transaction list on which a consensus is to be reached into a plurality of orderly arranged data fragments that have a same quantity as consensus nodes in the consensus network, and constructs a Merkle tree based on the plurality of orderly arranged data fragments.

It is worthwhile to note that note that the quantity of consensus nodes in the consensus network is N, N≥3f+1, and f is the maximum quantity of consensus nodes allowed to fail in the consensus network. Here, the transactions in the transaction list on which a consensus is to be reached can be specifically split into N orderly arranged data fragments equal to the quantity N of consensus nodes in the consensus network. Because the consensus nodes in the consensus network are arranged in a certain sequence, to facilitate subsequent recovery of the transaction list on which a consensus is to be reached before split, in some embodiments of the present specification, there can be a one-to-one correspondence between the N orderly arranged data fragments after split and the N consensus nodes in the consensus network based on the sequences of the N consensus nodes in the consensus network. For example, an ith data fragment of the N orderly arranged data fragments can be sent to an ith consensus node with a corresponding sequence, where i∈[0, N−1], and i is an integer.

FIG. 3 is a schematic diagram illustrating an actual scenario to which a consensus method in a consortium blockchain is applied, according to some embodiments of the present specification. The consensus network shown in FIG. 3 includes four consensus nodes, that is N=4, that is, the consensus primary node (p0) and consensus backup nodes (consensus nodes p1 to p3), where consensus node p3 is in an abnormal state in a consensus process, i.e. consensus node p3 is an abnormal consensus node in the consensus network.

Specifically, before a first stage, the consensus primary node in the consensus network can packages the transactions in the transaction list on which a consensus is to be reached as a message m0 as the target proposal, splits message 0 into four data fragments (s0 to s3) by using the specified erasure coding algorithm, and constructs a Merkle tree based on hash values of the four data fragments (s0 to s3) after split. The hash value of s0 is hash000, the hash value of s1 is hash001, the hash value of s2 is hash002, the hash value of s3 is hash003, hash (hash00, hash01)=hash00, hash (hash002, hash003)=hash01, and hash (hash01, hash02)= hash0, that is, a root hash of the Merkle tree.

Step 220. The consensus primary node constructs a VAL message corresponding to each data fragment based on the plurality of orderly arranged data fragments and the Merkle tree, sends each VAL message to a consensus node corresponding to a sequence of the data fragment in each VAL message, and locally saves a VAL message corresponding to the consensus primary node, where each VAL message includes one data fragment, a corresponding Merkle tree path, and the root hash of the Merkle tree.

In some embodiments provided by the present specification, the message sent by the consensus primary node to the consensus backup node in the PRE-PREPARE stage in the PBFT is changed to the VAL message, and a format of the VAL message is VAL (v, n, r, bi, si), where v is a current view number, n, n is a block number corresponding to the transaction list on which a consensus is to be reached, r is the root hash of the Merkle tree, and si is the data fragment included in the VAL message, i.e. an ith data fragment, and bi is a hash value associated with si on the Merkle tree path in the Merkle tree.

Optionally, that the consensus primary node constructs the VAL message corresponding to each data fragment based on the plurality of orderly arranged data fragments and the Merkle tree includes:

The consensus primary node constructs an ith VAL message based on a hash value of an ith data fragment in the plurality of orderly arranged data fragments and a hash value on an ith Merkle tree branch path in the Merkle tree; where i is an integer greater than or equal to 0 and less than N.

It should be understood that for the ith data fragment here, a generation mechanism of the VAL message corresponding to the ith data fragment is described by using any one of the plurality of orderly arranged data fragments as an example.

Optionally, after each VAL message is sent to each corresponding consensus node, to conveniently and quickly recovery and obtain the original transaction list on which a consensus is to be reached based on the data fragment included in each VAL message and the associated hash value on the corresponding hash path, in some embodiments of the present specification, a VAL message including a data fragment with a sequence corresponding to a sequence of each node is sent to a corresponding consensus node based on the sequences of the consensus nodes in the consensus network. Specifically, that the consensus primary node sends each VAL message to a consensus node corresponding to a sequence of the data fragment in each VAL message includes:

The consensus primary node sends the ith VAL message to an ith consensus node in the consensus network.

The consensus primary node saves, in the present node, a VAL message corresponding to a sequence of the consensus primary node in the VAL messages.

When N=4, the previous example in FIG. 3 is still used as an example, in the first stage, the consensus primary node locally saves a VAL message (i.e. VAL (v, n, b0, s0)) including s0, hash value b0 (hash001, hash01) of s0 on the hash path on the Merkle tree, and ash root hash hash0 of the Merkle tree, and constructs VAL messages based on other data fragments, corresponding Merkle tree paths, and the root hash of the Merkle tree, and sends the VAL messages to the consensus node corresponding to the data fragment in the VAL messages.

Specifically, a first VAL message (i.e. VAL (v, n, hash0, b1, s1)) including (s1 and hash000, hash01, hash0) can be sent to consensus node p1, a second VAL message (i.e. VAL(v, n, hash0, b2, s2)) including (s2 and hash030, hash00, hash0) can be sent to consensus node p2, and a third VAL message (i.e. VAL (v, n, hash0, b3, s3)) including (s3 and hash020, hash00, hash0) can be sent to consensus node p3.

Step 230. Each consensus node in the consensus network constructs an ECHO message for a received VAL message, and broadcasts the constructed ECHO message to the consensus network, where the constructed ECHO message includes a data fragment, a corresponding Merkle tree path, and the root hash of the Merkle tree in the received VAL message.

It is worthwhile to note that each consensus node in the consensus network can include not only the consensus backup nodes in the consensus network, but also the consensus primary node in the consensus network. Because the consensus primary node locally saves the VAL message corresponding to the sequence of the consensus primary node, and the sequence of the data fragment in the VAL message is consistent with the sequence of the consensus primary node, the consensus primary node can also construct the corresponding ECHO message based on the locally saved VAL message, and broadcast the ECHO message to the consensus network.

In some embodiments of the present specification, the message broadcast by the consensus node in the PREPARE stage in the PBFT algorithm is changed to the ECHO message, and a format of the ECHO message is ECHO (v, n, r, bj, sj). When the consensus node (including the consensus primary node) in the consensus network receives the VAL message, the consensus node verifies whether the root hash of the Merkle tree in the VAL data is correct; if no, discards the message; or if yes, constructs the ECHO message based on the received VAL message and broadcasts the ECHO message.

When the consensus node in the consensus network receives N−2f correct ECHO messages, a node state can be changed to a PRE-PREPARE complete state. If the consensus node in the consensus network does not receive the VAL message but receives the correct ECHO messages sent by other N−2f consensus nodes, the consensus node in the consensus network can obtain the original transaction list on which a consensus is to be reached and the corresponding Merkle tree through parsing based on the correct ECHO messages sent by the other N−2f consensus nodes, and construct and broadcast the ECHO message corresponding to the consensus node.

When N=4, the previous example in FIG. 3 is still used as an example, in the second stage, after verifying the received VAL message, the consensus backup node that receives the VAL message can construct the ECHO message including the received data fragment, the corresponding Merkle tree path, and the root hash of the Merkle tree based on the received VAL message, and broadcast the constructed ECHO message to other consensus nodes in the consensus network. The consensus primary node can construct the ECHO message including the data fragment corresponding to the sequence of the present node, the corresponding Merkle tree path, and the root hash of the Merkle tree based on the locally saved VAL message, and broadcast the constructed ECHO message to other consensus nodes in the consensus network.

Step 240. If a target consensus node in the consensus network does not receive a VAL message corresponding to the target consensus node within a predetermined time period but receives ECHO messages of N−2f consensus nodes, the target consensus node constructs an ECHO message corresponding to the target consensus node based on the ECHO messages of the N−2f consensus nodes, where f is a maximum quantity of abnormal consensus nodes allowed in the consensus network, N is a quantity of consensus nodes in the consensus network, and N≥3f+1.

The target consensus node can be any consensus backup node in the consensus network.

Optionally, in order that the target consensus node can still construct the ECHO message corresponding to the target consensus node without receiving the VAL message corresponding to the target consensus node, in some embodiments of the present specification, the target consensus node constructs the ECHO message corresponding to the target consensus node based on the ECHO messages of the N−2f consensus nodes includes:

The target consensus node obtains N−2f data fragments, Merkle tree paths of the N−2f data fragments in the Merkle tree, and the root hash of the Merkle tree in the ECHO messages of the N−2f consensus nodes based on the ECHO messages of the N−2f consensus nodes.

The target consensus node obtains, through parsing based on the N−2f data fragments, the Merkle tree paths of the N−2f data fragments in the Merkle tree, and the root hash of the Merkle tree, the plurality of orderly arranged data fragments obtained by splitting the transaction list on which a consensus is to be reached and the Merkle tree constructed by using the plurality of orderly arranged data fragments.

The target consensus node constructs the ECHO message corresponding to the target consensus node based on the plurality of orderly arranged data fragments obtained by splitting the transaction list on which a consensus is to be reached and the Merkle tree constructed by using the plurality of orderly arranged data fragments.

It should be understood that because the transactions in the transaction list on which a consensus is to be reached are split, by using the specified erasure coding algorithm, into the data fragments that have the same quantity as the consensus nodes in the consensus network, any node in the consensus network including any consensus backup node corresponds to one data fragment. If a certain consensus backup node in the consensus network does not receive a corresponding VAL message sent by the consensus primary node, the consensus node can obtain, through parsing based on the ECHO messages sent by the other N−2f consensus nodes (including the consensus primary node), the complete plurality of orderly arranged data fragments and the Merkle tree constructed by using the plurality of orderly arranged data fragments. As such, the consensus backup node can construct an ECHO message corresponding to the consensus node based on a data fragment corresponding to the present node in the plurality of orderly arranged data fragments, a corresponding Merkle tree path, and the root hash of the Merkle tree, and broadcast the ECHO message.

Specifically, that the target consensus node constructs the ECHO message corresponding to the target consensus node based on the plurality of orderly arranged data fragments obtained by splitting the transaction list on which a consensus is to be reached and the Merkle tree constructed by using the plurality of orderly arranged data fragments includes:

The target consensus node obtains a target data fragment corresponding to a sequence of the target consensus node from the plurality of orderly arranged data fragments;

the target consensus node constructs the ECHO message corresponding to the target consensus node based on the target data fragment, a Merkle tree path of the target data fragment in the Merkle tree, and the root hash of the Merkle tree.

Optionally, after the target consensus node constructs the ECHO message corresponding to the target consensus node, the method further includes:

The target consensus node broadcasts the ECHO message corresponding to the target consensus node to the consensus network;

If the consensus node in the consensus network receives the ECHO messages of N−f consensus nodes, a state of the consensus node in the consensus network is updated to a prepared state;

The consensus node in the consensus network constructs based on the ECHO messages of the N−f consensus nodes, a READY message including the root hash of the Merkle tree, a block number corresponding to the transaction list on which a consensus is to be reached, and a view number of a consensus operation performed on the transaction list on which a consensus is to be reached, and broadcasts the READY message to the consensus network.

In some embodiments provided by the present specification, the message broadcast by the consensus node in the COMMIT stage in the PBFT algorithm is changed to the READY message, and a format of the READY message is READY (v, n, r). When the consensus node (including the consensus primary node) in the consensus network receives N−f verified ECHO messages, the node constructs the READY message based on the received ECHO messages and broadcasts the READY message.

When N=4, the previous example in FIG. 3 is still used as an example, in the third stage, if the consensus primary node (consensus node p0) and the other consensus backup nodes (consensus node p1 and consensus node p2) in the consensus network receive the ECHO messages of not less than N−f consensus nodes, and the verification succeeds, the READY message and the message signature are sent to the other consensus nodes in the consortium blockchain.

Optionally, to avoid an impact on subsequent operations, after the consensus node in the consensus network constructs, based on the ECHO messages of the N−f consensus nodes, the READY message including the root hash of the Merkle tree, the block number corresponding to the transaction list on which a consensus is to be reached, and the view number of the consensus operation performed on the transaction list on which a consensus is to be reached, and broadcasts the READY message to the consensus network, the method provided in some embodiments of the present specification further includes:

If the consensus node in the consensus network receives N−f READY messages of the consensus node, the node commits the transaction list on which a consensus is to be reached to a state machine.

It should be understood that to avoid an impact on the consensus operation on the transaction list on which a consensus is to be reached and the subsequent consensus operation on data on which a consensus is to be reached, the method provided in some embodiments of the present specification further includes:

If the consensus network does not complete the consensus operation on the transactions in the transaction list on which a consensus is to be reached within the predetermined time period, the consensus node in the consensus network initiates a view change operation in the consensus network, to attempt to replace the consensus primary node in the consensus network.

In the consensus method provided in some embodiments of the present specification, the consensus primary node in the consensus network of the consortium blockchain splits, based on the specified erasure coding algorithm, the transactions in the transaction list on which a consensus is to be reached into the plurality of orderly arranged data fragments that have the same quantity as the consensus nodes in the consensus network, and constructs the Merkle tree based on the plurality of orderly arranged data fragments. The consensus primary node constructs the VAL message corresponding to each data fragment based on the plurality of orderly arranged data fragments, sends each VAL message to the consensus node corresponding to the sequence of the data fragment in each VAL message, and locally saves the VAL message corresponding to the consensus primary node, where each VAL message includes one data fragment, a corresponding Merkle tree path, and the root hash of the Merkle tree. Each consensus node in the consensus network constructs the ECHO message for the received VAL message, and broadcasts the constructed ECHO message to the consensus network, where the constructed ECHO message includes the data fragment, the corresponding Merkle tree path, and the root hash of the Merkle tree in the received VAL message. If the target consensus node in the consensus network does not receive the VAL message corresponding to the target consensus node within the predetermined time period but receives the ECHO messages of the N−2f consensus nodes, the target consensus node constructs the ECHO message corresponding to the target consensus node base on the ECHO messages of the N−2f consensus nodes.

In other words, in each round of consensus operation, even if some nodes do not receive the VAL message, it can be ensured that the complete transaction list on which a consensus is to be reached is obtained through parsing when 2f+1 ECHO messages are received, that is, it can be ensured that when some nodes do not receive the VAL message, the system can continue to perform the consensus operation on the transaction list on which a consensus is to be reached.

Figure 4:
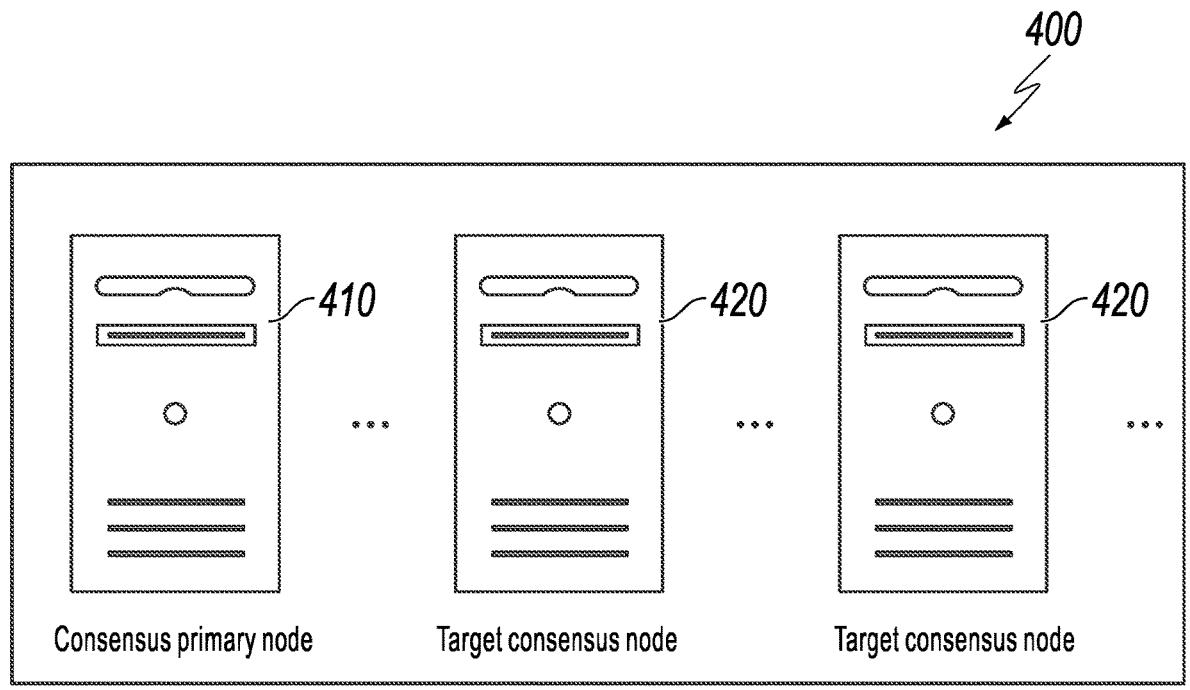
FIG. 4 is a schematic structural diagram illustrating a system in a consortium blockchain, according to some embodiments of the present specification.

FIG. 4 is a schematic structural diagram illustrating a system in a consortium blockchain 400, according to some embodiments of the present specification. Referring to FIG. 4, in a software implementation, the system 400 in a consortium blockchain can include a consensus primary node 410 and a plurality of target consensus nodes 420.

The consensus primary node 410 in a consensus network of a consortium blockchain is configured to split, based on a specified erasure coding algorithm, transactions in a transaction list on which a consensus is to be reached into a plurality of orderly arranged data fragments that have a same quantity as consensus nodes in the consensus network, and construct a Merkle tree based on the plurality of orderly arranged data fragments; and construct a VAL message corresponding to each data fragment based on the plurality of orderly arranged data fragments and the Merkle tree, send each VAL message to a consensus node corresponding to a sequence of the data fragment in each VAL message, and locally save a VAL message corresponding to the consensus primary node, where each VAL message includes one data fragment, a corresponding Merkle tree path, and a root hash of the Merkle tree.

Each of the consensus nodes 410 and 420 in the consensus network is configured to construct an ECHO message for a received VAL message, and broadcast the constructed ECHO message to the consensus network, where the constructed ECHO message includes a data fragment, a corresponding Merkle tree path, and the root hash of the Merkle tree in the received VAL message.

If the target consensus node 420 in the consensus network does not receive a VAL message corresponding to the target consensus node within a predetermined time period but receives ECHO messages of N−2f consensus nodes, the target consensus node constructs an ECHO message corresponding to the target consensus node based on the ECHO messages of the N−2f consensus nodes, where f is a maximum quantity of abnormal consensus nodes allowed in the consensus network, N is a quantity of consensus nodes in the consensus network, and N≥3f+1.

Based on the system in consortium blockchain provided in some embodiments of the present specification, the following can be understood:

In each round of consensus operation, even if some consensus nodes do not receive the VAL message, it can be ensured that the complete transaction list on which a consensus is to be reached is obtained through parsing when 2f+1 ECHO messages are received, that is, it can be ensured that when some consensus nodes do not receive the VAL message, the system can continue to perform the consensus operation on the transaction list on which a consensus is to be reached.

Optionally, in an implementation, the target consensus node 420 is configured to obtain N−2f data fragments, Merkle tree paths of the N−2f data fragments in the Merkle tree, and the root hash of the Merkle tree in the ECHO messages of the N−2f consensus nodes based on the ECHO messages of the N−2f consensus nodes; obtain, through parsing based on the N−2f data fragments, the Merkle tree paths of the N−2f data fragments in the Merkle tree, and the root hash of the Merkle tree, the plurality of orderly arranged data fragments obtained by splitting the transaction list on which a consensus is to be reached and the Merkle tree constructed by using the plurality of orderly arranged data fragments; and construct the ECHO message corresponding to the target consensus node based on the plurality of orderly arranged data fragments obtained by splitting the transaction list on which a consensus is to be reached and the Merkle tree constructed by using the plurality of orderly arranged data fragments.

Optionally, in an implementation, the target consensus node 420 is configured to obtain a target data fragment corresponding to a sequence of the target consensus node from the plurality of orderly arranged data fragments; and construct the ECHO message corresponding to the target consensus node based on the target data fragment, a Merkle tree path of the target data fragment in the Merkle tree, and the root hash of the Merkle tree.

Optionally, in an implementation, after the target consensus node 420 constructs the ECHO message corresponding to the target consensus node, the target consensus node 420 is configured to broadcast the ECHO message corresponding to the target consensus node to the consensus network.

If the consensus node 410 or the consensus node 420 in the consensus network receive ECHO messages of N−f consensus nodes, the consensus node 410 or the consensus node 420 updates a state of the consensus node in the consensus network to a prepared state.

The consensus node 410 or the consensus node 420 in the consensus network constructs, based on the ECHO messages of the N−f consensus nodes, a READY message including the root hash of the Merkle tree, a block number corresponding to the transaction list on which a consensus is to be reached, and a view number of a consensus operation performed on the transaction list on which a consensus is to be reached, and broadcasts the READY message to the consensus network.

Optionally, in an implementation, after the consensus node 410 or the consensus node 420 in the consensus network constructs, based on the ECHO messages of the N−f consensus nodes, the READY message including the root hash of the Merkle tree, the block number corresponding to the transaction list on which a consensus is to be reached, and the view number of the consensus operation performed on the transaction list on which a consensus is to be reached, and broadcasts the READY message to the consensus network, the consensus node 410 or the consensus node 420 in the consensus network is further configured to: if the consensus node in the consensus network receives N−f READY messages of the consensus node, commit the transaction list on which a consensus is to be reached to a state machine.

Optionally, in an implementation, the target consensus node 410 is configured to construct an ith VAL message based on a hash value of an ith data fragment in the plurality of orderly arranged data fragments and a hash value on an ith Merkle tree branch path in the Merkle tree, where i is the integer greater than or equal to 0 and less than N.

Optionally, in an implementation, the target consensus node 410 is configured to send the ith VAL message to an ith consensus node in the consensus network; and save, in the present node, a VAL message corresponding to a sequence of the consensus primary node in the VAL messages.

Optionally, in an implementation, the consensus node 410 or the consensus node 420 in the consensus network is configured to: if the consensus network does not complete, within the predetermined time period, the consensus operation on the transactions in the transaction list on which a consensus is to be reached, initiate a view change operation in the consensus network.

The system 400 in a consortium blockchain can implement the methods according to the method embodiments of FIG. 2 and FIG. 3, with particular reference to the consensus methods in the consortium blockchain of the embodiments shown in FIG. 2 and FIG. 3, and details are omitted for simplicity.

In conclusion, the previous descriptions are merely preferred embodiments of the present specification, and are not intended to limit the scope of protection of the present specification. Any modification, equivalent substitution, improvement, etc. made within the spirit and principles of one or more embodiments of the present specification shall fall within the scope of the one or more embodiments of the present specification.

The systems, apparatuses, modules, or units illustrated in the previous embodiments can be implemented by using a computer chip or an entity, or can be implemented by using a product having a certain function. A typical implementation device is a computer. Specifically, the computer can be a personal computer, a laptop computer, a cellular phone, a camera phone, a smart phone, a personal digital assistant, a media player, a navigation device, an email receiving and sending device, a game console, a tablet computer, a wearable device, or any combination of these devices.

A computer readable medium includes persistent, non-persistent, movable, and unmovable media that can save information by using any method or technology. Information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to save information that can be accessed by a computing device. As described in the present specification, the computer readable medium does not include computer readable transitory media such as a modulated data signal and a carrier.

It is worthwhile to note that the terms "comprise", "include", or any other variation thereof, are intended to cover a non-exclusive inclusion, such that a process, a method, a product, or a device that includes a list of elements does not include only those elements but further include other elements not expressly listed or inherent to such process, method, product, or device. An element proceeded by the phrase "comprise a . . . " does not, without more constraints, preclude the existence of additional identical elements in the process, method, product, or device that includes the element.

The embodiments in the present specification are described in a progressive way. For same or similar parts of the embodiments, references can be made to the embodiments. Each embodiment focuses on a difference from other embodiments. Particularly, the system embodiments are similar to method embodiments, and therefore are described briefly. For a related part, references can be made to some descriptions in the method embodiments.

What is claimed is:

1. A computer-implemented method, comprising:
   splitting, by a primary node in a consensus network that comprises a plurality of consensus nodes, one or more transactions in a transaction list into a plurality of data fragments, wherein a number of the plurality of data fragments equals a number of the plurality of consensus nodes in the consensus network, and a consensus is to be reached on the one or more transactions in the transaction list among the plurality of consensus nodes in the consensus network;
   constructing, by the primary node, a Merkle tree based on the plurality of data fragments;
   constructing, by the primary node, a plurality of first messages, based on the plurality of data fragments and the Merkle tree, wherein each of the plurality of first messages comprises a data fragment, a Merkle tree path of the data fragment, and a root hash of the Merkle tree, and wherein the each of the plurality of first messages corresponds to a respective data fragment of the plurality of data fragments and a respective consensus node of the plurality of consensus nodes in the consensus network;

sending, by the primary node, the each of the plurality of first messages to the respective consensus node;

saving, by the primary node, one of the plurality of first messages corresponding to the primary node locally, wherein the one of the plurality of first messages corresponding to the primary node comprises a first data fragment, a first Merkle tree path of the first data fragment, and the root hash of the Merkle tree;

constructing, by the primary node, a second message based on the one of the plurality of first messages corresponding to the primary node, wherein the second message comprises the first data fragment, the first Merkle tree path of the first data fragment, and the root hash of the Merkle tree; and broadcasting, by the primary node, the second message to the consensus network;

receiving, by the primary node, other second messages broadcasted by other consensus nodes in the consensus network; and determining, by the primary node, whether a consensus on the one or more transactions is reached based on the other second messages.

2. The computer-implemented method according to claim 1, wherein:

N is the number of the plurality of consensus nodes in the consensus network, f is a number of abnormal consensus nodes allowed in the consensus network, and determining, by the primary node, whether the consensus on the one or more transactions is reached based on the other second messages comprises:

in response to determining that the primary node receives second messages of N−f consensus nodes, updating a state of the primary node in the consensus network to a prepared state;

constructing, by the primary node based on the second messages of the N−f consensus nodes, a third message, wherein the third message comprises the root hash of the Merkle tree, a block number corresponding to the transaction list, and a view number of the consensus on the transaction list;

broadcasting, by the primary node, the third message to the consensus network; and in response to determining that the primary node receives N−f third messages, determining, by the primary node, that the consensus on the one or more transactions is reached.

3. The computer-implemented method according to claim 1 wherein the other consensus nodes in the consensus network comprises a target consensus node, and the method further comprises:

in response to determining that the target consensus node does not receive a target first message corresponding to the target consensus node within a predetermined time period but receives second messages from N−2f consensus nodes, constructing, by the target consensus node, a constructed second message based on the second messages from the N−2f consensus nodes, wherein N is the number of the consensus nodes in the consensus network, f is a number of abnormal consensus nodes allowed in the consensus network, and N≥3f+1.

4. The computer-implemented method according to claim 3, wherein constructing, by the target consensus node, the constructed second message based on the second messages from the N−2f consensus nodes comprises:

obtaining, by the target consensus node and from the second messages of the N−2f consensus nodes, N−2f data fragments corresponding to the N−2f consensus nodes, Merkle tree paths of the N−2f data fragments in the Merkle tree, and the root hash of the Merkle tree in the second messages of the N−2f consensus nodes;

obtaining, by the target consensus node through parsing the N−2f data fragments, the Merkle tree paths of the N−2f data fragments in the Merkle tree, and the root hash of the Merkle tree, the plurality of data fragments and the Merkle tree; and constructing, by the target consensus node, the constructed second message based on the plurality of data fragments and the Merkle tree.

5. The computer-implemented method according to claim 4, wherein constructing, by the target consensus node, the constructed second message based on the plurality of data fragments and the Merkle tree comprises:

obtaining, by the target consensus node, a target data fragment corresponding to the target consensus node from the plurality of data fragments; and constructing, by the target consensus node, the constructed second message based on the target data fragment, a target Merkle tree path of the target data fragment in the Merkle tree, and the root hash of the Merkle tree.

6. The computer-implemented method according to claim 3, wherein after constructing, by the target consensus node, the constructed second message, the method further comprises:

broadcasting, by the target consensus node, the constructed second message to the consensus network;

in response to determining that the target consensus node in the consensus network receives second messages of N−f consensus nodes, updating a state of the target consensus node in the consensus network to a prepared state; and constructing, by the target consensus node based on the second messages of the N−f consensus nodes, a third message and broadcasting the third message to the consensus network, wherein the third message comprises the root hash of the Merkle tree, a block number corresponding to the transaction list, and a view number of the consensus on the transaction list.

7. The computer-implemented method according to claim 6, wherein after constructing, by the target consensus node based on the second messages of the N−f consensus nodes, the third message and broadcasting the third message to the consensus network, the method further comprises:

in response to determining that the target consensus node in the consensus network receives N−f third messages, committing the transaction list to a state machine.

8. The computer-implemented method according to claim 1, wherein:

the number of the plurality of data fragments is N, and constructing, by the primary node, the plurality of first messages based on the plurality of data fragments and the Merkle tree comprises:

constructing, by the primary node, an ith first message based on a hash value of an ith data fragment in the plurality of data fragments and a hash value on an ith Merkle tree path in the Merkle tree, wherein i is an integer greater than or equal to 0 and less than N.

9. The computer-implemented method according to claim 8, wherein:

the plurality of data fragments are arranged in an order; and sending, by the primary node, the each of the plurality of first messages to the respective consensus node comprises:
sending, by the primary node, the ith first message to an ith consensus node in the consensus network according to the order.

10. The computer-implemented method according to claim 1, in response to determining that the consensus network does not complete the consensus on the one or more transactions within a predetermined time period, allowing, by the primary node, one or more consensus nodes in the consensus network to initiate replacement of the primary node by another consensus node in the consensus network.

11. The computer-implemented method according to claim 1, wherein the one or more transactions in the transaction list are split into the plurality of data fragments based on an erasure coding algorithm.

12. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
splitting, by a primary node in a consensus network that comprises a plurality of consensus nodes, one or more transactions in a transaction list into a plurality of data fragments, wherein a number of the plurality of data fragments equals a number of the plurality of consensus nodes in the consensus network, and a consensus is to be reached on the one or more transactions in the transaction list among the plurality of consensus nodes in the consensus network;
constructing, by the primary node, a Merkle tree based on the plurality of data fragments;
constructing, by the primary node, a plurality of first messages, based on the plurality of data fragments and the Merkle tree, wherein each of the plurality of first messages comprises a data fragment, a Merkle tree path of the data fragment, and a root hash of the Merkle tree, and wherein the each of the plurality of first messages corresponds to a respective data fragment of the plurality of data fragments and a respective consensus node of the plurality of consensus nodes in the consensus network;
sending, by the primary node, the each of the plurality of first messages to the respective consensus node;
saving, by the primary node, one of the plurality of first messages corresponding to the primary node locally, wherein the one of the plurality of first messages corresponding to the primary node comprises a first data fragment, a first Merkle tree path of the first data fragment, and the root hash of the Merkle tree;
constructing, by the primary node, a second message based on the one of the plurality of first messages corresponding to the primary node, wherein the second message comprises the first data fragment, the first Merkle tree path of the first data fragment, and the root hash of the Merkle tree;
broadcasting, by the primary node, the second message to the consensus network;
receiving, by the primary node, other second messages broadcasted by other consensus nodes in the consensus network; and determining, by the primary node, whether a consensus on the one or more transactions is reached based on the other second messages.

13. The computer-implemented system according to claim 12, wherein:
N is the number of the plurality of consensus nodes in the consensus network,
f is a number of abnormal consensus nodes allowed in the consensus network, and
determining, by the primary node, whether the consensus on the one or more transactions is reached based on the other second messages comprises:
in response to determining that the primary node receives second messages of N−f consensus nodes, updating a state of the primary node in the consensus network to a prepared state;
constructing, by the primary node based on the second messages of the N−f consensus nodes, a third message, wherein the third message comprises the root hash of the Merkle tree, a block number corresponding to the transaction list, and a view number of the consensus on the transaction list;
broadcasting, by the primary node, the third message to the consensus network; and
in response to determining that the primary node receives N−f third messages, determining, by the primary node, that the consensus on the one or more transactions is reached.

14. The computer-implemented system according to claim 12, wherein the other consensus nodes in the consensus network comprises a target consensus node, and the operations further comprise:
in response to determining that the target consensus node does not receive a target first message corresponding to the target consensus node within a predetermined time period but receives second messages from N−2f consensus nodes, constructing, by the target consensus node, a constructed second message based on the second messages from the N−2f consensus nodes, wherein N is the number of the consensus nodes in the consensus network, f is a number of abnormal consensus nodes allowed in the consensus network, and N≥3f+1.

15. The computer-implemented system according to claim 14, wherein constructing, by the target consensus node, the constructed second message based on the second messages from the N−2f consensus nodes comprises:
obtaining, by the target consensus node and from the second messages of the N−2f consensus nodes, N−2f data fragments corresponding to the N−2f consensus nodes, Merkle tree paths of the N−2f data fragments in the Merkle tree, and the root hash of the Merkle tree in the second messages of the N−2f consensus nodes;
obtaining, by the target consensus node through parsing the N−2f data fragments, the Merkle tree paths of the N−2f data fragments in the Merkle tree, and the root hash of the Merkle tree, the plurality of data fragments and the Merkle tree; and
constructing, by the target consensus node, the constructed second message based on the plurality of data fragments and the Merkle tree.

16. The computer-implemented system according to claim 12, wherein:
the number of the plurality of data fragments is N, and
constructing, by the primary node, the plurality of first messages based on the plurality of data fragments and the Merkle tree comprises:

constructing, by the primary node, an ith first message based on a hash value of an ith data fragment in the plurality of data fragments and a hash value on an ith Merkle tree path in the Merkle tree, wherein i is an integer greater than or equal to 0 and less than N.

17. The computer-implemented system according to claim 12, wherein the operations further comprise:

in response to determining that the consensus network does not complete the consensus on the one or more transactions within a predetermined time period, allowing, by the primary node, one or more consensus nodes in the consensus network to initiate replacement of the primary node by another consensus node in the consensus network.

18. A non-transitory, computer-readable medium storing one or more instructions executable by a computer system to perform operations comprising:

splitting, by a primary node in a consensus network that comprises a plurality of consensus nodes, one or more transactions in a transaction list into a plurality of data fragments, wherein a number of the plurality of data fragments equals a number of the plurality of consensus nodes in the consensus network, and a consensus is to be reached on the one or more transactions in the transaction list among the plurality of consensus nodes in the consensus network;

constructing, by the primary node, a Merkle tree based on the plurality of data fragments;

constructing, by the primary node, a plurality of first messages, based on the plurality of data fragments and the Merkle tree, wherein each of the plurality of first messages comprises a data fragment, a Merkle tree path of the data fragment, and a root hash of the Merkle tree, and wherein the each of the plurality of first messages corresponds to a respective data fragment of the plurality of data fragments and a respective consensus node of the plurality of consensus nodes in the consensus network;

sending, by the primary node, the each of the plurality of first messages to the respective consensus node;

saving, by the primary node, one of the plurality of first messages corresponding to the primary node locally, wherein the one of the plurality of first messages corresponding to the primary node comprises a first data fragment, a first Merkle tree path of the first data fragment, and the root hash of the Merkle tree;

constructing, by the primary node, a second message based on the one of the plurality of first messages corresponding to the primary node, wherein the second message comprises the first data fragment, the first Merkle tree path of the first data fragment, and the root hash of the Merkle tree;

broadcasting, by the primary node, the second message to the consensus network;

receiving, by the primary node, other second messages broadcasted by other consensus nodes in the consensus network; and determining, by the primary node, whether a consensus on the one or more transactions is reached based on the other second messages.

19. The non-transitory, computer-readable medium according to claim 18, wherein:

N is the number of the plurality of consensus nodes in the consensus network, f is a number of abnormal consensus nodes allowed in the consensus network, and determining, by the primary node, whether the consensus on the one or more transactions is reached based on the other second messages comprises:

in response to determining that the primary node receives second messages of N−f consensus nodes, updating a state of the primary node in the consensus network to a prepared state;

constructing, by the primary node based on the second messages of the N−f consensus nodes, a third message, wherein the third message comprises the root hash of the Merkle tree, a block number corresponding to the transaction list, and a view number of the consensus on the transaction list;

broadcasting, by the primary node, the third message to the consensus network; and in response to determining that the primary node receives N−f third messages, determining, by the primary node, that the consensus on the one or more transactions is reached.

20. The non-transitory, computer-readable medium according to claim 18, wherein the other consensus nodes in the consensus network comprises a target consensus node, and the operations further comprise:

in response to determining that the target consensus node does not receive a target first message corresponding to the target consensus node within a predetermined time period but receives second messages from N−2f consensus nodes, constructing, by the target consensus node, a constructed second message based on the second messages from the N−2f consensus nodes, wherein N is the number of the consensus nodes in the consensus network, f is a number of abnormal consensus nodes allowed in the consensus network, and N≥3f+1.

* * * * *